(12) United States Patent
Greenwood et al.

(10) Patent No.: US 11,836,359 B2
(45) Date of Patent: Dec. 5, 2023

(54) BLOCK STORAGE WITH VOLUME LOCALITY PLACEMENT BASED ON PERFORMANCE REQUIREMENTS

(71) Applicant: Amazon Technologies, Inc., Seattle, WA (US)

(72) Inventors: Christopher Magee Greenwood, Seattle, WA (US); Patrick E. Brennan, Seattle, WA (US); Mitchell Gannon Flaherty, Seattle, WA (US); Yilin Guo, Seattle, WA (US); Gary Michael Herndon, Jr., Seattle, WA (US); Sriram Venugopal, Issaquah, WA (US); Linfeng Yu, Seattle, WA (US); Wells Lin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 16/747,707

(22) Filed: Jan. 21, 2020

(65) Prior Publication Data
US 2020/0150888 A1     May 14, 2020

Related U.S. Application Data

(63) Continuation of application No. 15/967,266, filed on Apr. 30, 2018, now Pat. No. 10,599,354.

(51) Int. Cl.
*G06F 3/00* (2006.01)
*G06F 3/06* (2006.01)

(52) U.S. Cl.
CPC ........... *G06F 3/0631* (2013.01); *G06F 3/067* (2013.01); *G06F 3/0611* (2013.01);
(Continued)

(58) Field of Classification Search
None
See application file for complete search history.

(56) References Cited

U.S. PATENT DOCUMENTS

| 7,962,520 B2 * | 6/2011 | Patterson ................ G06F 16/22 707/791 |
| 10,528,279 B2 * | 1/2020 | Nasu ..................... G06F 3/0604 |

(Continued)

FOREIGN PATENT DOCUMENTS

JP            7107981 B2 *   7/2022   ......... G06F 9/45558

OTHER PUBLICATIONS

Aget Suma, Computer System, 2022, JP-7107981, translation. (Year: 2022).*

*Primary Examiner* — Midys Rojas
(74) *Attorney, Agent, or Firm* — Klarquist Sparkman, LLP

(57) ABSTRACT

A block storage service can ensure volumes are placed in a same region as an attached virtual machine instance for performance and durability guarantees. A region can reference multiple things, but one example is that a volume is within a same spine as a virtual machine in order to meet performance guarantees. Each region can have a buffer of server computers held in reserve for volumes having a type where performance guarantees are required. If performance guarantees cannot be met, a rejection is transmitted to the customer. In another embodiment, the customer can provide a list in priority order of different volume types so that if a desired volume type cannot be placed, then alternative volume types can be used.

16 Claims, 11 Drawing Sheets

(52) U.S. Cl.
CPC .......... *G06F 3/0613* (2013.01); *G06F 3/0647* (2013.01); *G06F 3/0653* (2013.01); *G06F 3/0665* (2013.01)

(56) References Cited

U.S. PATENT DOCUMENTS

| | | | |
|---|---|---|---|
| 10,599,354 B1* | 3/2020 | Greenwood | G06F 3/0647 |
| 10,834,190 B2* | 11/2020 | Rao | G06F 3/067 |
| 2011/0072230 A1* | 3/2011 | Dudgeon | G06F 3/0644 |
| | | | 711/E12.001 |
| 2015/0281407 A1* | 10/2015 | Raju | H04L 69/163 |
| | | | 718/1 |
| 2016/0034289 A1* | 2/2016 | Amano | G06F 11/34 |
| | | | 718/1 |
| 2017/0324813 A1* | 11/2017 | Jain | H04L 41/5009 |

* cited by examiner

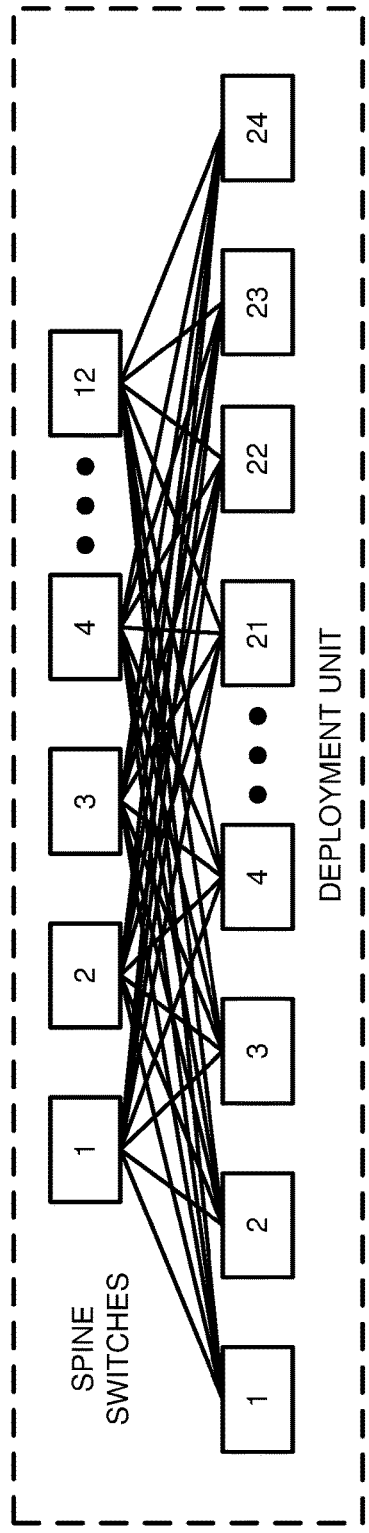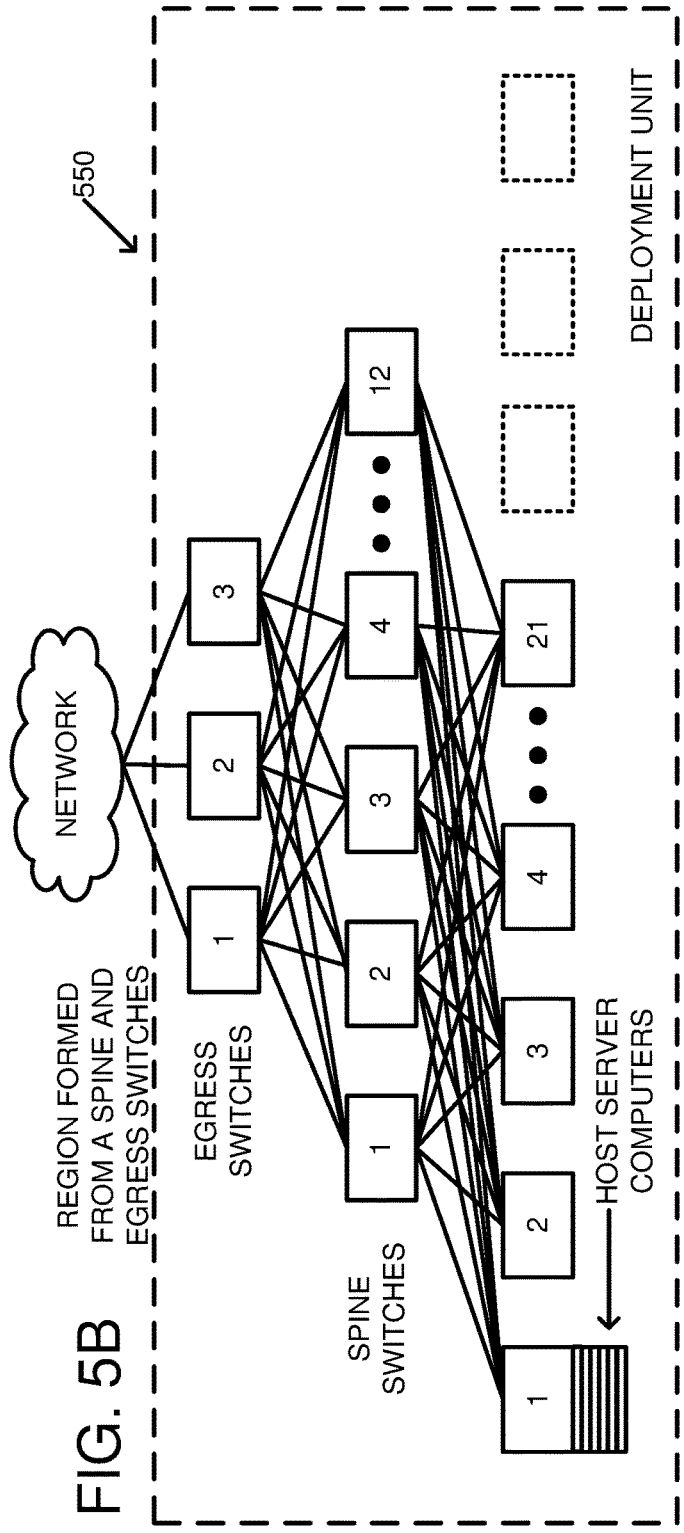

BLOCK STORAGE WITH VOLUME LOCALITY PLACEMENT BASED ON PERFORMANCE REQUIREMENTS

CROSS-REFERENCE TO RELATED APPLICATION

This is a continuation of U.S. application Ser. No. 15/967,266, filed on Apr. 30, 2018, which application is incorporated herein by reference in its entirety.

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In some cases, virtual machine instances execute under a virtualization layer that exposes a logical volume stored on partitions distributed between data storage servers. However, determining how volume partitions should be distributed to achieve optimal performance, durability, and availability can be challenging, particularly when conditions, constraints, and partition locations can change over time.

BRIEF DESCRIPTION OF THE DRAWINGS

FIGS. 5(a) and 5(b) illustrate views of a Clos network style deployment unit that can be utilized as a region in accordance with various embodiments.

DETAILED DESCRIPTION

A block storage service is disclosed that can ensure partitions are placed in localities for performance and durability guarantees. Locality can reference multiple things including servers or network levels. One example of a locality guarantee is where a volume is within a same spine as a virtual machine in order to meet performance guarantees.

The block storage service can check at the time of a request for a volume location having a minimum performance guarantee, such as server computers that can store a volume within a same region as the virtual machine instance. If nothing is available, the request can be rejected. In some implementations, a warning can be given to the customer that their request cannot be met, and then the customer can decide what to do with the volume based on their own preferences. In yet another embodiment, the customer can provide a list of varying levels of volume performance in a priority order so that if the first performance level on the list can be satisfied, then the rest of the list is ignored. If the first priority level on the list cannot be satisfied, then the next alternative on the list is analyzed, and so on, until one of the alternatives on the list can be satisfied. If none of the alternatives can be satisfied, then the request is rejected.

Figure 1:
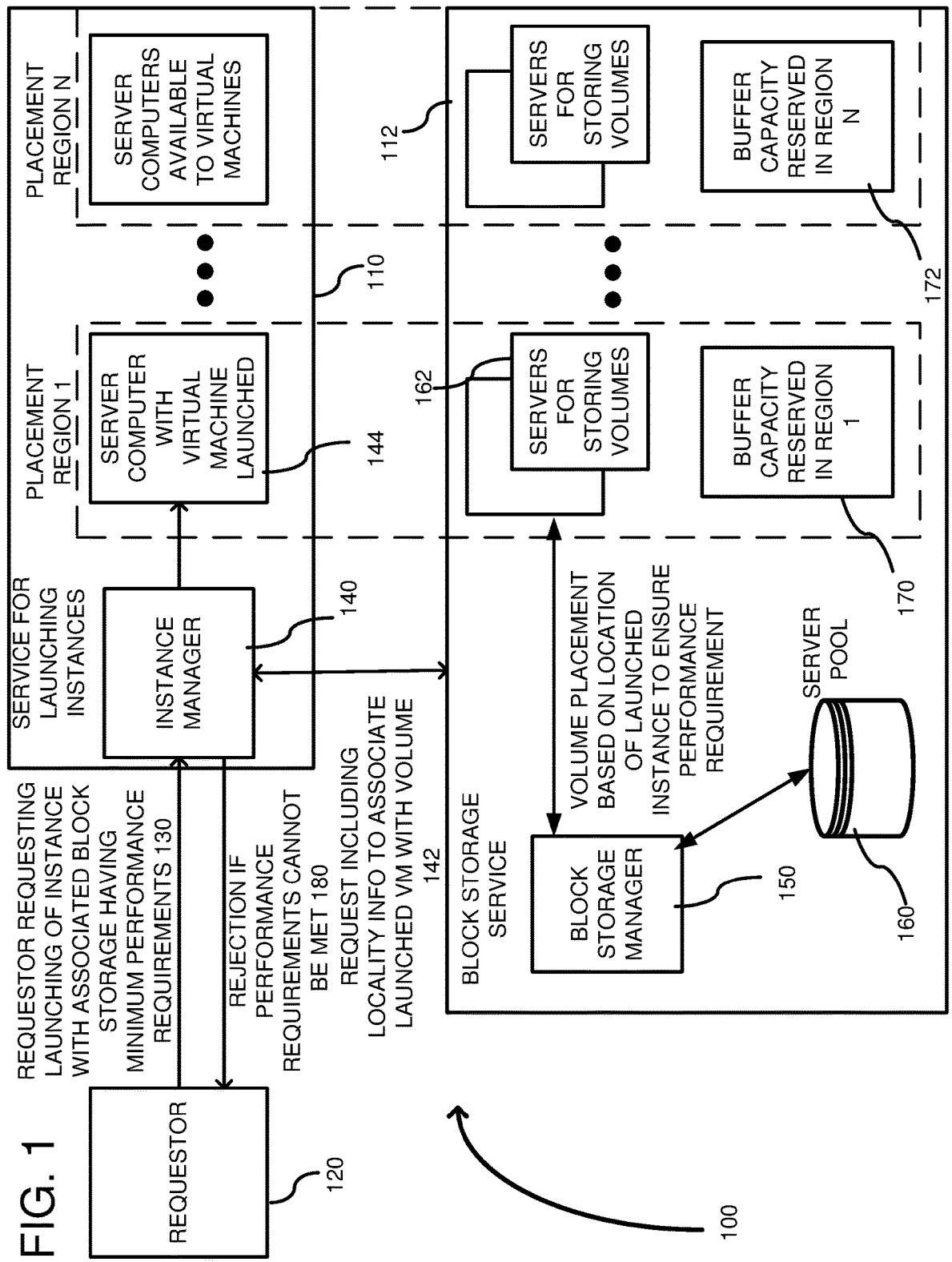
FIG. 1 is a system diagram showing locality placement of a volume based on performance requirements.

FIG. 1 is a system diagram showing a multi-tenant environment 100 wherein different services are used to launch a virtual machine instance and associated volume of storage. The services include a service 110 for launching virtual machine instances and a service 112 for placing storage volumes. Although separate services are shown, the services 110, 112 can be joined into a single service within the multi-tenant environment 100. A requestor 120, which can be a customer of the multi-tenant environment or another service within the multi-tenant environment, submits a request for launching an instance with an associated block storage having minimum performance requirements, as shown at 130. Although varying levels of security can be used within the service 110, the request is shown as being received directly by an instance manager 140, which can search for a server computer within any of multiple regions shown as region 1 through N. As described more fully below, each region 1 through N includes a plurality of server computers coupled together by routers and/or switches in a hierarchical fashion. The particular structure of the regions is not of importance. Rather, the regions are defined so as to ensure performance guarantees. Typically, in order to meet performance requirements, a virtual machine should be in a location as near to a storage volume as is possible, which reduces a number of switches that are traversed when the volume is accessed.

Once the instance manager 140 finds an appropriate server computer 144 upon which to launch a virtual machine, the instance manager 140 sends a request 142 to the block storage service 112. The request can include locality information associated with the chosen server computer. For example, the server computer 144 within region 1 can be considered the selected server computer. In such a case, the instance manager 140 can include in the request 142 that region 1 is the region where the virtual machine was launched.

The block storage service 112 includes a block storage manager 150, which can receive the request 142 and search for an available server computer within the block storage service 112 for volume placement. The block storage manager 150 can first search a server pool 160 which includes available servers for storing volumes within the block storage service 112. Once a list of available servers is obtained, the block storage manager 150 can reduce the list to only server computers within the region received within the request 142. For example, region 1 can be a region in which to search for available server computers. Once a server computer 162 is found within the specified region and which is available in accordance with the server pool 160, then the block storage manager can place (i.e., launch) that volume on the determined server computer 162. To ensure that there is sufficient opportunity to place high performance volumes, the block storage service 112 can provide additional buffers 170, 172 in each region. The buffers 170, 172 can be reserved for only volumes of certain types, such as a volume having minimum performance requirements. The block storage manager 150 can first store volumes on the server computers 162 within a region before using the buffers 170 from that same region. Nonetheless, by having separate buffers 170, 172, the block storage manager 150 can have sufficient storage needed for the volumes having higher performance requirements. Each region 1-N (where N is any integer number) can have its own buffer capacity so that the block storage manager 150 has extra capacity to place volumes in any regions.

If the block storage manager 150 placed a volume on one of the servers within the specified region, the block storage manager transmits a response to the instance manager 140 that placement was successful. Either the instance manager 140 or the block storage manager 150 can then coordinate attaching the virtual machine 144 with the storage volume 162 within the block storage service 112 so that the virtual machine and the storage volume are associated together. The instance manager 140 can also respond to the requestor 120 that the request was successful. On the other hand, if the block storage manager 150 is unable to place the volume within the appropriate region, it transmits a rejection to the instance manager 140, which then can transmit a corresponding rejection 180 to the requestor indicating that the performance requirements cannot be met. Assuming, however, proper placement, the server computer 144 upon which the virtual machine is launched is in a same region as the server computers 162 associated with the block storage service 112. By maintaining the server computers within the same region, a guaranteed performance level can be maintained. More specifically, by being positioned near each other, the server computer 144 having the virtual machine instance executed thereon can make requests to the storage volume and the storage volume can respond with a guaranteed levels of Input/Output Operations Per Second (IOPS), latency and throughput.

In an alternative embodiment, the instance manager 140 can determine server computers that are available for launching instances. This information can be communicated to the block storage in the form of a list of potential servers or regions. The block storage manager 150 can then use this information to choose a server computer on which to place the storage volume. The selected region can then be passed back to the instance manager 140, which can then launch the virtual machine instance within the same region. Thus, there can be a coordinated effort between the services in choosing which region to launch the virtual machine instance and the storage volume.

The communications between the requestor 120 and the service 110, and communications between the services 110, 112 can be accomplished using Application Programming Interfaces (API). Services are commonly used in cloud computing. A service is a software function provided at a network address over the web or the cloud. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

Figure 2:
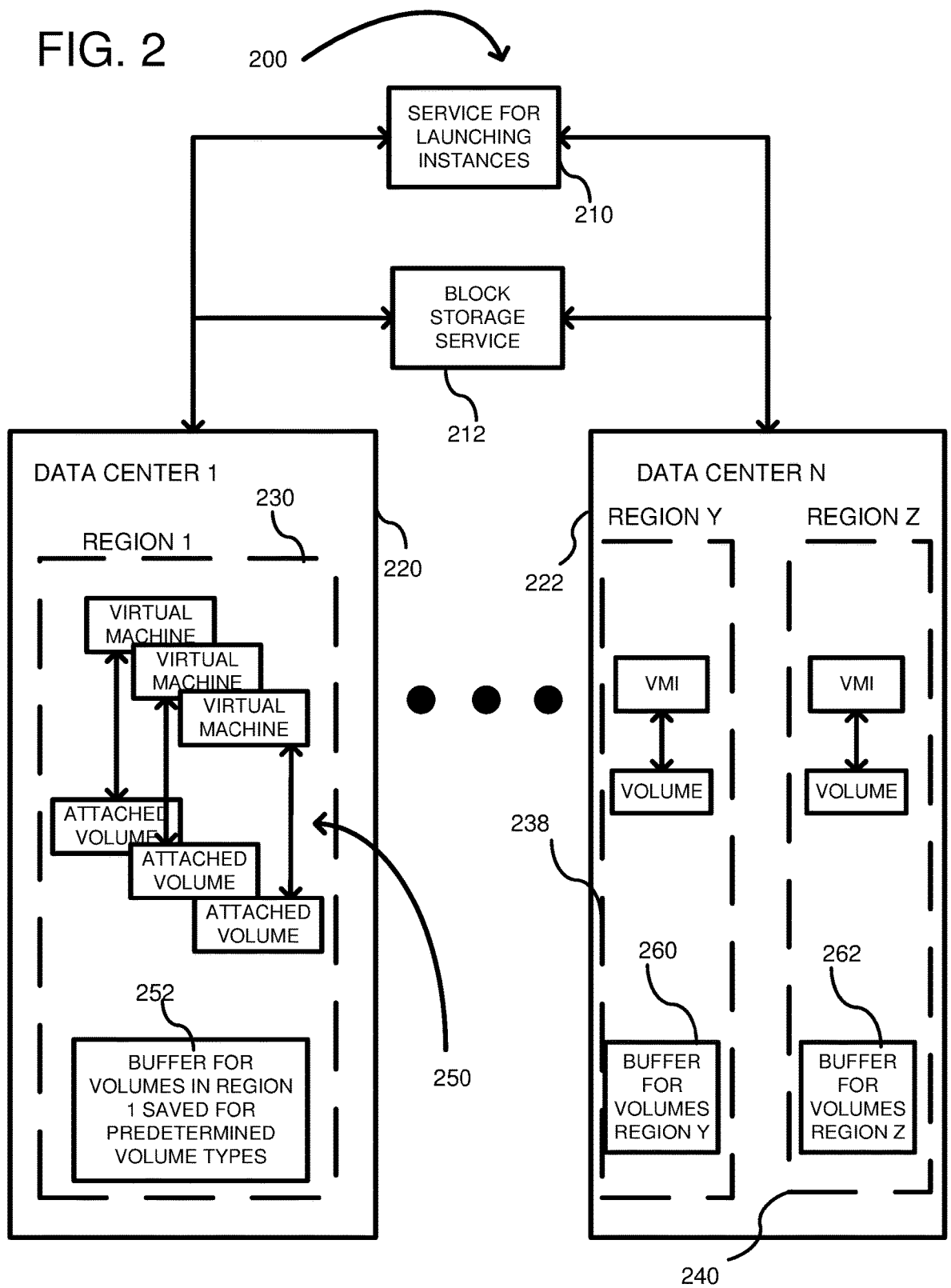
FIG. 2 is a system diagram showing virtual machines attached to volumes within a same region, and buffers within the regions reserved for predetermined volume types.

FIG. 2 illustrates a compute service provider environment 200 including a service for launching instances 210 and a block storage service 212. The compute service provider environment 200 includes a plurality of data centers, such as data center 1, shown at 220 through data center N, shown at 222, where N is any number. The services 210, 212 are typically also located in a data center (not shown), and can be in the same data center as the instances and volumes that are being placed, as described further below. Each data center includes a plurality of resources (e.g., hardware assets, such as host server computers, routers, switches, etc.) within one or more buildings. As illustrated, each data center 220, 222 includes one or more regions in which virtual machines can be attached to storage volumes while maintaining guaranteed performance requirements. More specifically, a region is defined as an area having server computers for launching virtual machines and for placing storage volumes wherein the virtual machines are sufficiently close in physical distance such that performance requirements (including IOPS, latency, and throughput) can be met. Data center 220 includes a single region 230. Different network topologies can be used within a region as described further below. Nonetheless, the network topologies include a hierarchy of switches and/or routers for coupling together a plurality of server computers. As illustrated at 250, the region 230 includes a plurality of virtual machines and attached volumes, which have been launched by the services 210, 212. The region 230 also includes additional capacity (e.g., a plurality of server computers) 252 used as a buffer for the volumes in region 1 and saved for predetermined volume types. Typically, the predetermined volume types are ones that have guaranteed performance requirements related to IOPS, latency and throughput.

Data center 222 includes multiple regions 238, 240, each of which has its own buffer 260, 262 held in reserve for predetermined volume types, such as high performance volumes. Thus, as shown each data center can have any number of regions, which include groups of server computers available for launching virtual machines and placing storage volumes. Additionally, each region includes its own buffer reserve for predetermined volume types. The regions 230, 238, 240 are treated as independent areas, such that buffers for one region are not used for a different region. Additionally, for guaranteed performance requirements, virtual machine instances and attached volumes are positioned within the same region. Thus, volumes have different types associated with performance, and volumes of a predetermined type are given priority within a region by having a buffer of reserved capacity and every effort is made to launch the virtual machine and attached volume within the same region. The reserved capacity can be related to having a percentage of spare capacity relative to a total capacity for storing volumes. In one example, portions of a server computer are considered units of available capacity and are considered part of an overall capacity. Thus, what portions of a server computers are reserved can change so long as the overall buffer capacity remains at the desired percentage.

Figure 3:
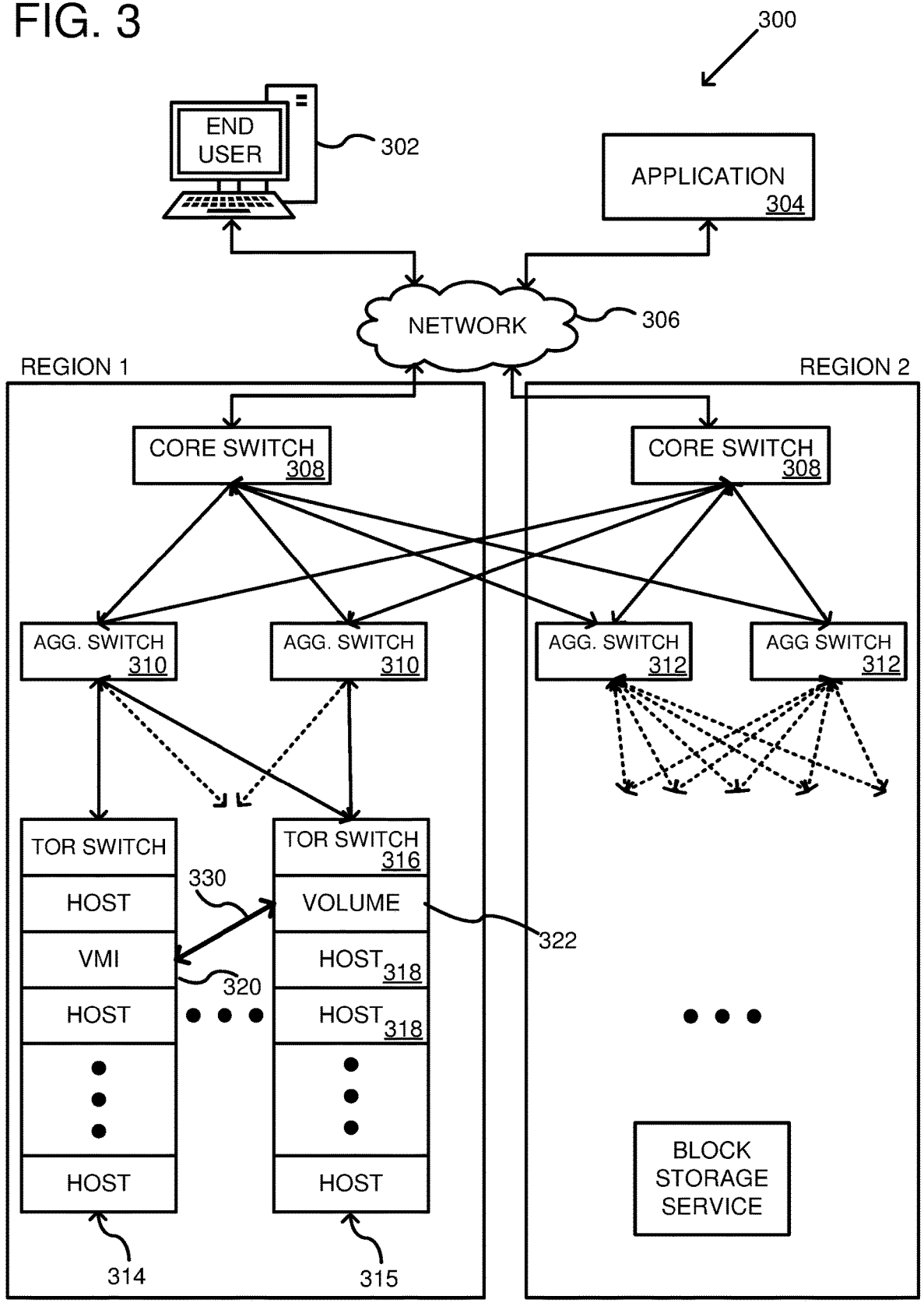
FIG. 3 illustrates an example of a highly connected network design that can be used in accordance with various embodiments, wherein regions are shown having core switches, aggregation switches, and server racks and the block storage service is positioned within one of the regions.

FIG. 3 illustrates an example configuration 300 of a hierarchical structure of routers and/or switches that can be used in a region. Each region represents a traditional hierarchical network design that can be used to route requests to specific host machines or other such devices, in order to provide users or applications with access to a variety of distributed resources. This example shows a typical design that can be used for a data center, wherein a source such as an end user device 302 or application 304 is able to send requests across a network 306, such as the Internet, to be received by one or more components of the data center. Properties of various components of the network, such as provisioned instances, etc., can be managed using at least one management system, component, or service, such as the block storage service or service for launching instances, described above. In the illustrated example, the requests are received over the network to one of a plurality of core switches 308, but it should be understood that there can be any of a number of other components between the network and the core switches. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 308 is able to communicate with each of a plurality of aggregation switches 310, 312, which in at least some embodiments are utilized in pairs. Utilizing aggregation switches in pairs provides a redundant capability in case one or the switches experiences a failure or is otherwise unavailable, such that the other device can route traffic for the connected devices. Each pair of aggregation switches 310, 312 is linked to a plurality of physical racks 314, 315, each of which typically contains a top of rack (TOR) or "access" switch 316 and a plurality of physical host machines 318, such as data servers and other processing devices. As an additional benefit, the use of aggregation switch pairs enables the capability of a link to be exceeded during peak periods, for example, wherein both aggregation switches can concurrently handle and route traffic. Each pair of aggregation switches can service a dedicated number of racks based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 306. In some embodiments, the core switches are provided in pairs as well, for purposes including redundancy.

A virtual machine instance 320 is positioned within the rack 314 and an associated storage volume 322 is within the rack 315. As shown by logical arrow 330, the storage volume 322 is attached to the virtual machine instance 320. By having close proximity (within the same region), the virtual machine instance 320 can access the storage volume through the TOR switch 316 and a single layer of aggregation switches 310. Thus, by being in the same region, the storage volume can be accessed by traversing 1-5 layers of switches as opposed to other locations where 6 or more layers of switches are needed. This close proximity allows performance of the volume to have minimum guarantees in terms of TOPS, latency and throughput.

Figure 4:
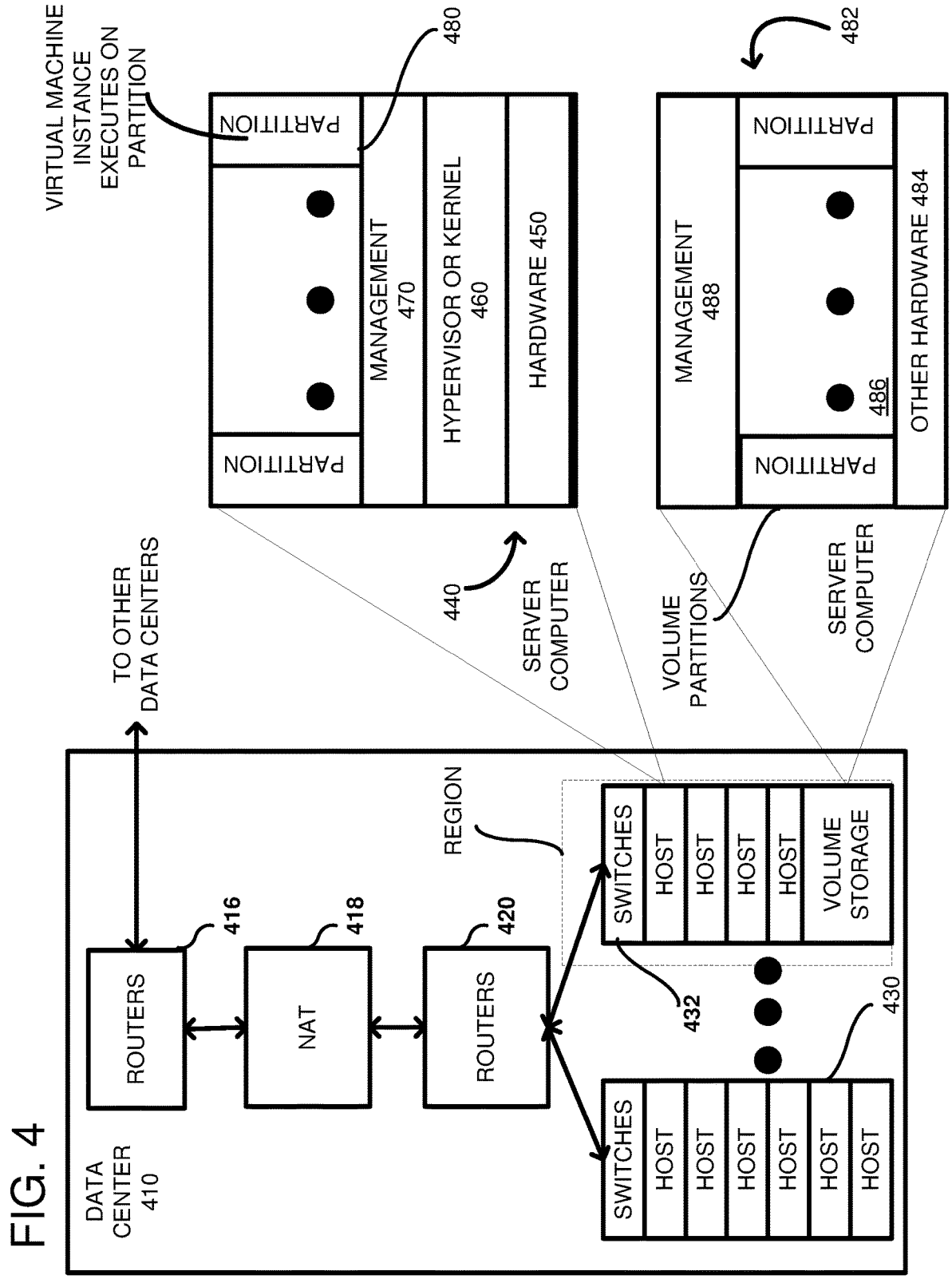
FIG. 4 illustrates an example region including a rack of server computers within a data center.

FIG. 4 provides additional details of a structure for server computers having virtual machine instances and volume storage thereon. Additionally, another embodiment of a region is shown, wherein volumes and virtual machine instances are within the same rack so that only one layer of a switch needs to be traversed in order to access the volume. Multiple data centers, including data center 410, can be coupled together by routers 416. The routers 416 read address information in a received packet and determine the packet's destination. If the router decides that a different data center contains a host server computer, then the packet is forwarded to that data center. If the packet is addressed to a host in the data center 410, then it is passed to a network address translator (NAT) 418 that converts the packet's public IP address to a private IP address. The NAT also translates private addresses to public addresses that are bound outside of the datacenter 410. Additional routers 420 can be coupled to the NAT to route packets to one or more racks of host server computers 430. Each rack 430 can include a switch 432 coupled to multiple host server computers. A particular host server computer is shown in an expanded view at 440.

Each host 440 has underlying hardware 450 including one or more CPUs, memory, storage devices, etc. Running a layer above the hardware 450 is a hypervisor or kernel layer 460. The hypervisor or kernel layer can be classified as a type 1 or type 2 hypervisor. A type 1 hypervisor runs directly on the host hardware 450 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor or separated therefrom and generally includes device drivers needed for accessing the hardware 450. The partitions 480 are logical units of isolation by the hypervisor. Each partition 480 can be allocated its own portion of the hardware layer's memory, CPU allocation, storage, etc. Additionally, each partition can include a virtual machine and its own guest operating system. As such, each partition is an abstract portion of capacity designed to support its own virtual machine instance independent of the other partitions.

A particular volume storage is shown at 482. The hardware layer is shown as including general hardware 484 (CPU, memory, etc.), and a storage layer 486, upon which multiple partitions are stored. The partitions are a portion of a volume so that a volume can be distributed over multiple server computers or stored on a single server computer. In any event, the storage layer 486 can include storage that uses memory-type storage (e.g., one or more solid state drives), hard-disk drives or other types of drives that store data using magnetism. A management layer 488 can be similar to management layer 470 and allows volume partitions from different customers to be stored in the storage layer without access to the other partitions.

For a virtual machine instance 480 to access a partition on the volume storage 482, the virtual machine instance can send a request through a TOR switch 432, which is received by the management layer 488 of the volume storage 482. The management layer can then respond to the request and the response is again transmitted through the TOR switch 432 back to the virtual machine instance 480. In some cases, intra-rack communication can occur without traversing the switch 432.

FIGS. 5A and 5B show different network topologies for embodiments of regions, which are described as deployment units. In this particular example, FIGS. 5A and 5B show a Clos network approach, wherein there are twenty-one racks each with at least one TOR switch (actual or local), and each of the TOR switches is connected to an array of twelve spine switches, which typically is located in another physical rack. The array of spine switches corresponds to a "center" stage in a traditional Clos network design. Because there are twelve hosts, there are twelve "up" connections and twelve "down" connections to the spine switches. The design thus provides a high radix network based on a re-arrangably non-blocking Clos network.

The design presented illustrates a two-tier folded Clos network. As seen in the configuration 500 of FIG. 5(a), there are effectively two layers of switches: a layer of spine switches and a layer of edge switches. Three of the edge switches, however, can be utilized as egress switches that pass data onto the network, as shown in FIG. 5(b). FIG. 5(b) thus illustrates a logical arrangement 550 of the switches, herein referred to as a "deployment unit," showing the three edge switches as egress switches which sit at the "top" of the group of switches and pass data "up and out" of the deployment unit. Each of the twelve spine switches can be thought of as having a port out the logical "back" side to one of the three egress switches, but the three switches are simply one of the twenty-four edge servers illustrated in a folded representation. The egress switches have the only connections out of the deployment unit, while the remaining edge switches have connections to underlying devices. All traffic into and out of the deployment unit thus is routed through one of the three egress switches, although different numbers of switches can be used in different embodiments.

The layers of the deployment unit have fully meshed connectivity provided by the spine switches. Some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches. The data within the deployment unit can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the deployment units can be replicated multiple times within a data center, for example, wherein a Clos-style network effectively manages traffic across all of the deployment units in the data center. Thus, a data center can have as many regions as desired using the Clos-type network topology, wherein each deployment unit can be considered a region.

Figure 6:
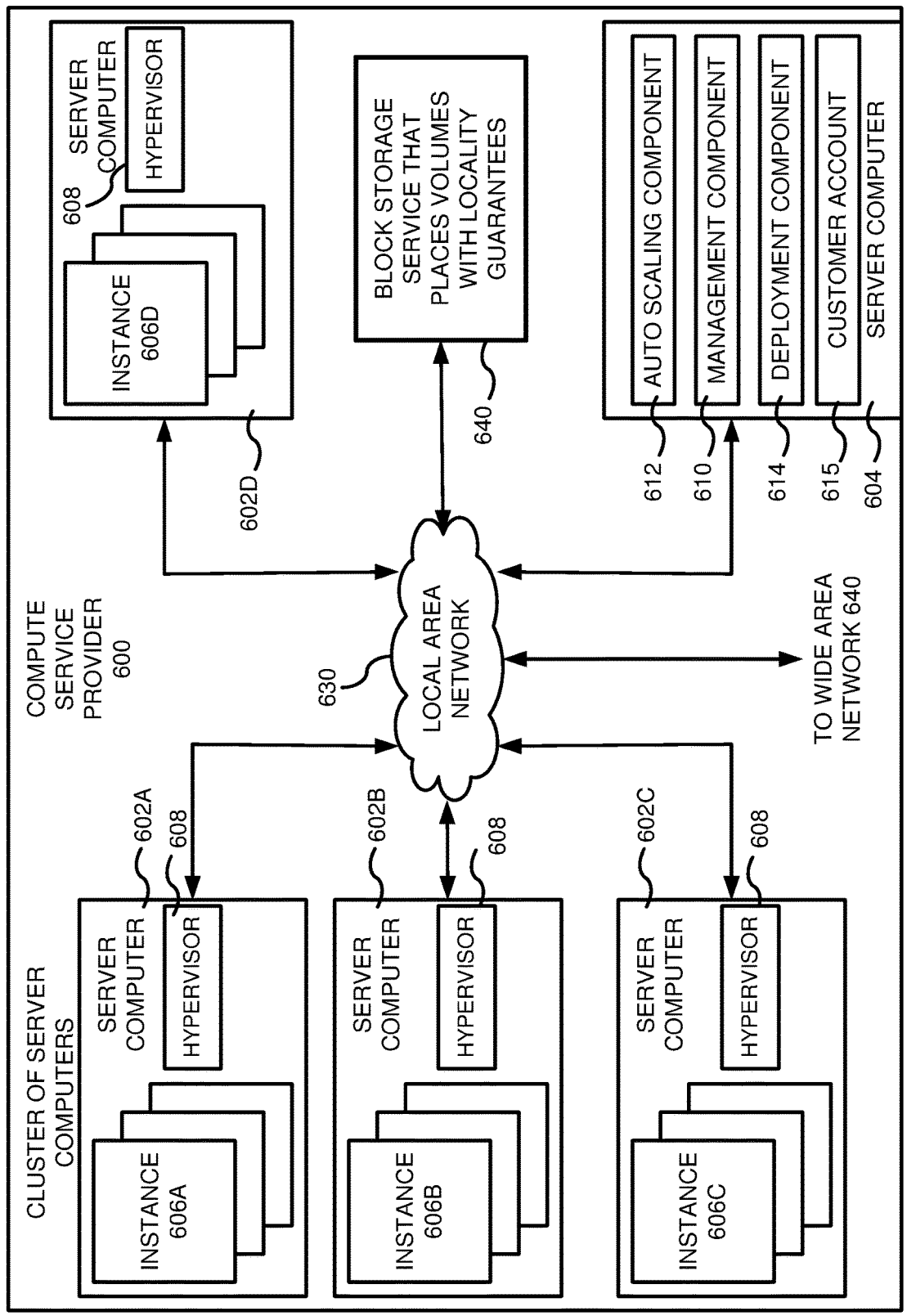
FIG. 6 is an example system diagram showing a plurality of virtual machine instances running in the multi-tenant environment with a block storage service that places volumes with locality guarantees.

FIG. 6 is a computing system diagram of a network-based compute service provider 600 that illustrates one environment in which embodiments described herein can be used.

By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the server computers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For example, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. Thus, the deployment component 614 can be considered to be the instance manager (see 140, FIG. 1) or to include the instance manager. The configuration, cache logic, and other information may be specified by a customer using the management component 610 or by providing this information directly to the deployment component 614.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A block storage service 640 is shown that works in conjunction with the deployment component 614 to ensure that launched instances 606 are within a same region of the compute service provider as volumes of storage. As described further below, the block storage service 640 can determine a location where the instance 606 is launched and ensure that any attached storage volume is located within a same region of the compute service provider, so as to minimize a number of network switches to be traversed between the instance and the storage volume.

Figure 7:
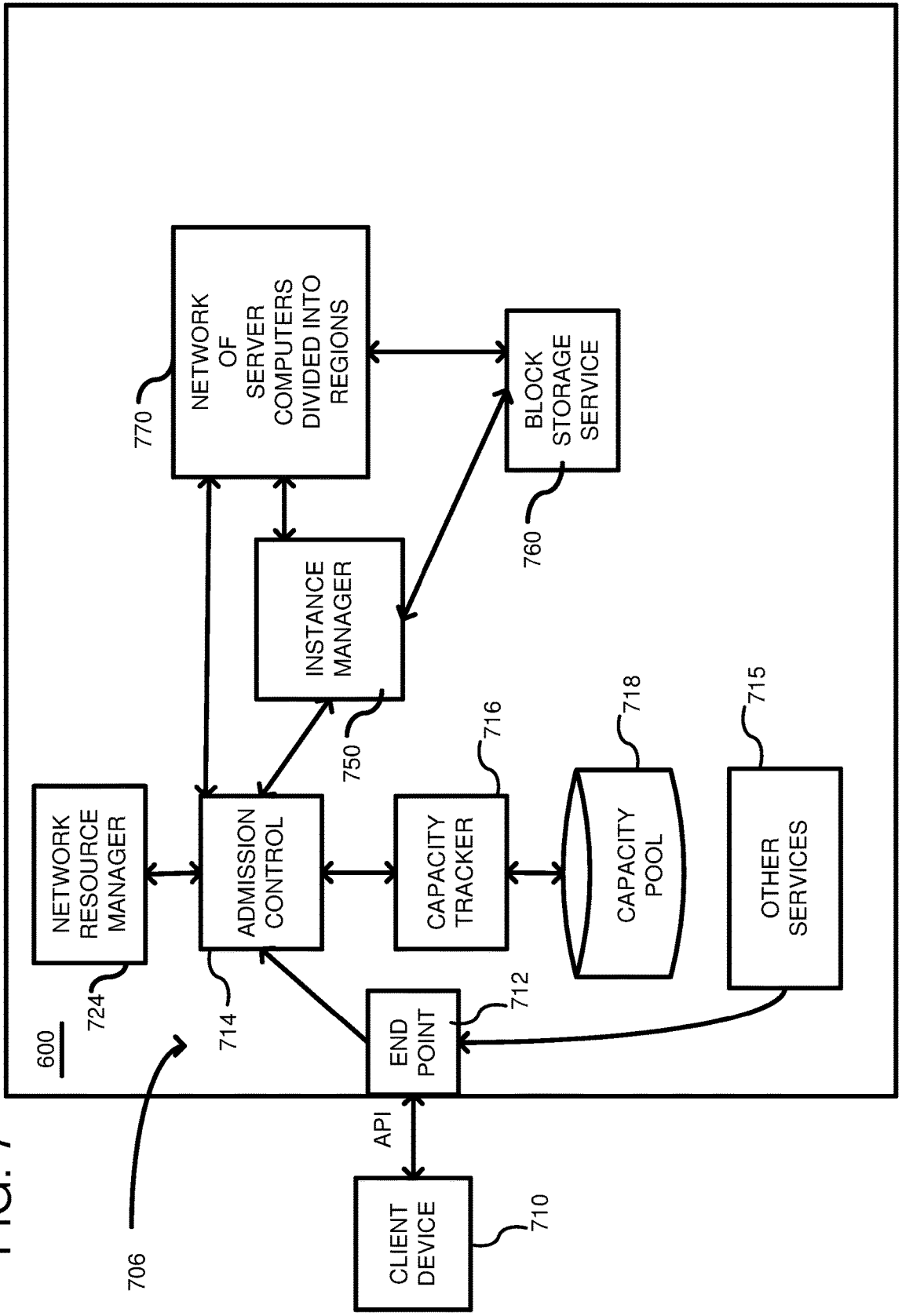
FIG. 7 shows further details of an example system including a plurality of management components associated with a control plane in the multi-tenant environment.

FIG. 7 illustrates in further detail management components 706 that can be used in the multi-tenant environment of the compute service provider 600. In order to access and utilize instances (such as instances 606 of FIG. 6), a client device can be used. The client device 710 can be any of a variety of computing devices, mobile or otherwise including a cell phone, smartphone, handheld computer, Personal Digital Assistant (PDA), desktop computer, etc. The client device 710 can communicate with the compute service provider 600 through an end point 712, which can be a DNS address designed to receive and process API requests. In particular, the end point 712 can be a web server configured to expose an API. Using the API requests, a client 710 can make requests to implement any of the functionality described herein. Other services 715, which can be internal to the compute service provider 600, can likewise make API requests to the end point 712.

Other general management services that may or may not be included in the compute service provider 600 include an admission control 714, e.g., one or more computers operating together as an admission control service. The admission control 714 can authenticate, validate and unpack the API requests for service or storage of data within the compute service provider 600. The capacity tracker 716 is responsible for determining how the servers need to be configured in order to meet the need for the different instance types by managing and configuring physical inventory in terms of forecasting, provisioning and real-time configuration and allocation of capacity. The capacity tracker 716 maintains a pool of available inventory in a capacity pool database 718. The capacity tracker 716 can also monitor capacity levels so as to know whether resources are readily available or limited. An instance manager 750 controls launching and termination of instances in the network. When an instruction is received (such as through an API request) to launch an instance, the instance manager pulls resources from the capacity pool 718 and launches the instance on a decided upon host server computer. A block storage service 760 controls initiation and termination of storage volumes, while the network resource manager 724 relates to initiation and termination of routers, switches, subnets, etc. A network of server computers 770 is divided into regions and includes a physical layer upon which the instances are launched and upon which storage volumes are placed. The configuration of the regions can be any desired network topology, some of which are shown in FIGS. 3, 4 and 5. Other network topologies can be used.

Figure 8:
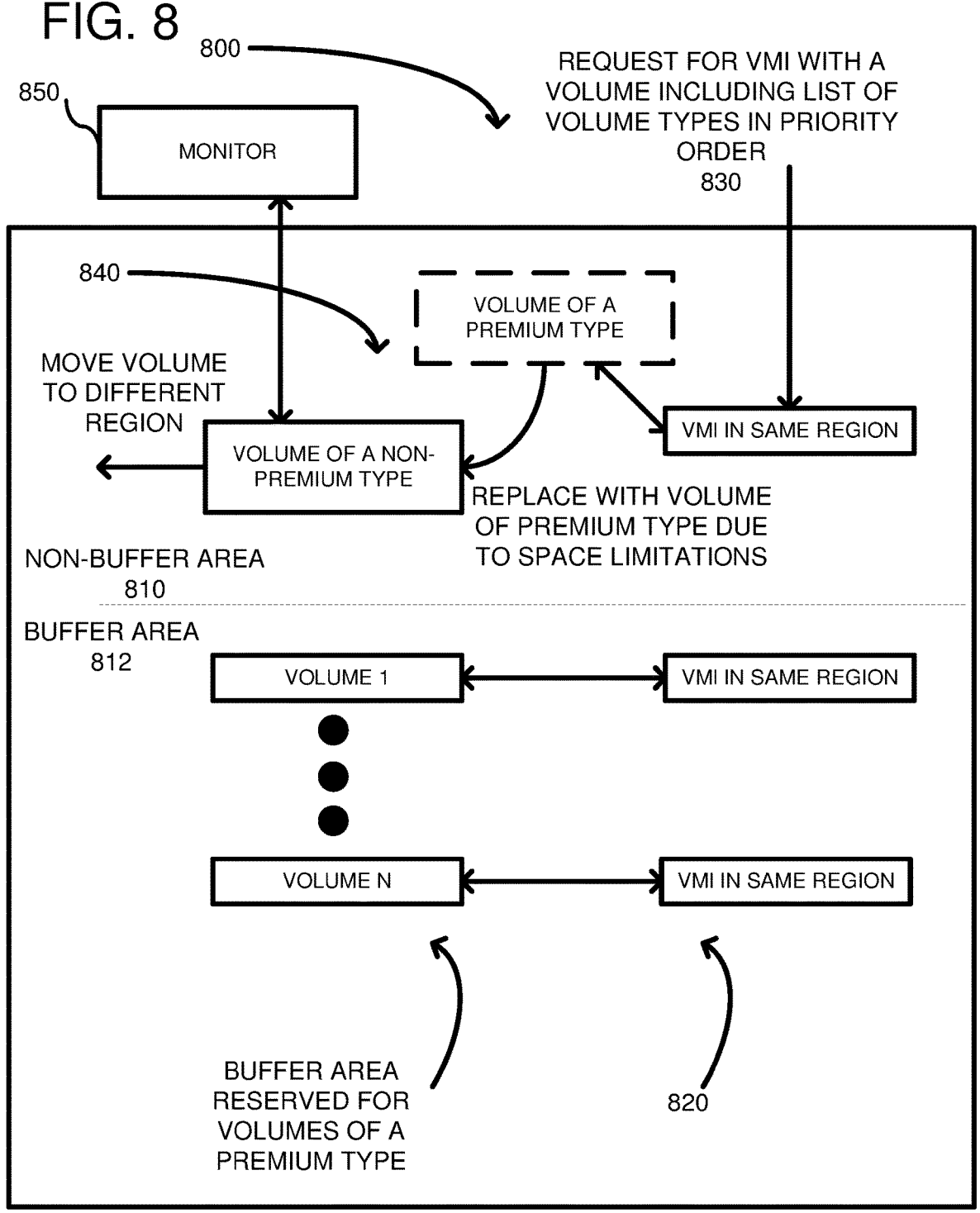
FIG. 8 shows a block storage service having buffer and non-buffer areas and moving a volume out of a server computer to make room for a premium-type volume.

FIG. 8 is an example of a block storage service 800 including a non-buffer area 810 and a buffer area 812. The non-buffer area includes a plurality of server computers that can store volumes of a variety of types. The volume storage types can be independent of performance requirements or have performance requirements that allow for a virtual machine to be positioned in one region with the attached volume in a different region. By being in different regions, six or more switches are typically traversed to communicate in one direction from the instance to the volume storage. The buffer area 812, by contrast, has volumes stored in the same region as virtual machine instances, as shown at 820. As described above, being in the same region can be defined as being in a same rack, having a same spine in a network topology, being in a same data center, etc. Typically, however, a region does not extend beyond a single data center. The buffer area 812 is reserved for volumes having a same type and are typically volumes having the highest available performance characteristics, including TOPS, latency and throughput.

When the buffer area 812 becomes unavailable due to capacity or other reasons, the block storage service 800 can choose to move volumes stored in the non-buffer area that are not of the premium type of volumes (i.e., those having no guarantees or lesser guarantees on performance.) For example, as shown at 830, a request can be received for a virtual machine instance and an attached volume. The request, such as an API, can include a list of volume types in a priority order of alternatives. For example, a first volume type can be attempted first, and if it fails, then a second volume type on the list is attempted second, and so on, until one of the volume types on the list is accepted. In order to place the volume types in case of insufficient capacity, a non-premium volume type can be moved from its current storage location as shown at 840. Thus, a volume of a first type (a premium type) is given priority over a volume of a second type (a non-premium type.) As a result, the non-premium volume is moved to a different region within the same data center or within another data center. Thus, premium volumes are given priority over other volume types, wherein premium volumes are related to having faster performance characteristics.

In an alternative embodiment, volume usage can be monitored by monitor 850 and if the usage of the volume is below a threshold amount, then the volume can be moved. Monitoring can be achieved by the block storage service itself, or an external service. The monitoring can include ping or push type monitoring. For example, the monitor 850 can send periodic ping requests to a block storage manager, or a push can be sent to the monitor 850 each time a volume is accessed. In yet another alternative, the monitor 850 can determine whether the volume is attached to a virtual machine and, if not, how long it has been unattached. Unattached volumes can be given low priority and are subject to being moved.

Figure 9:
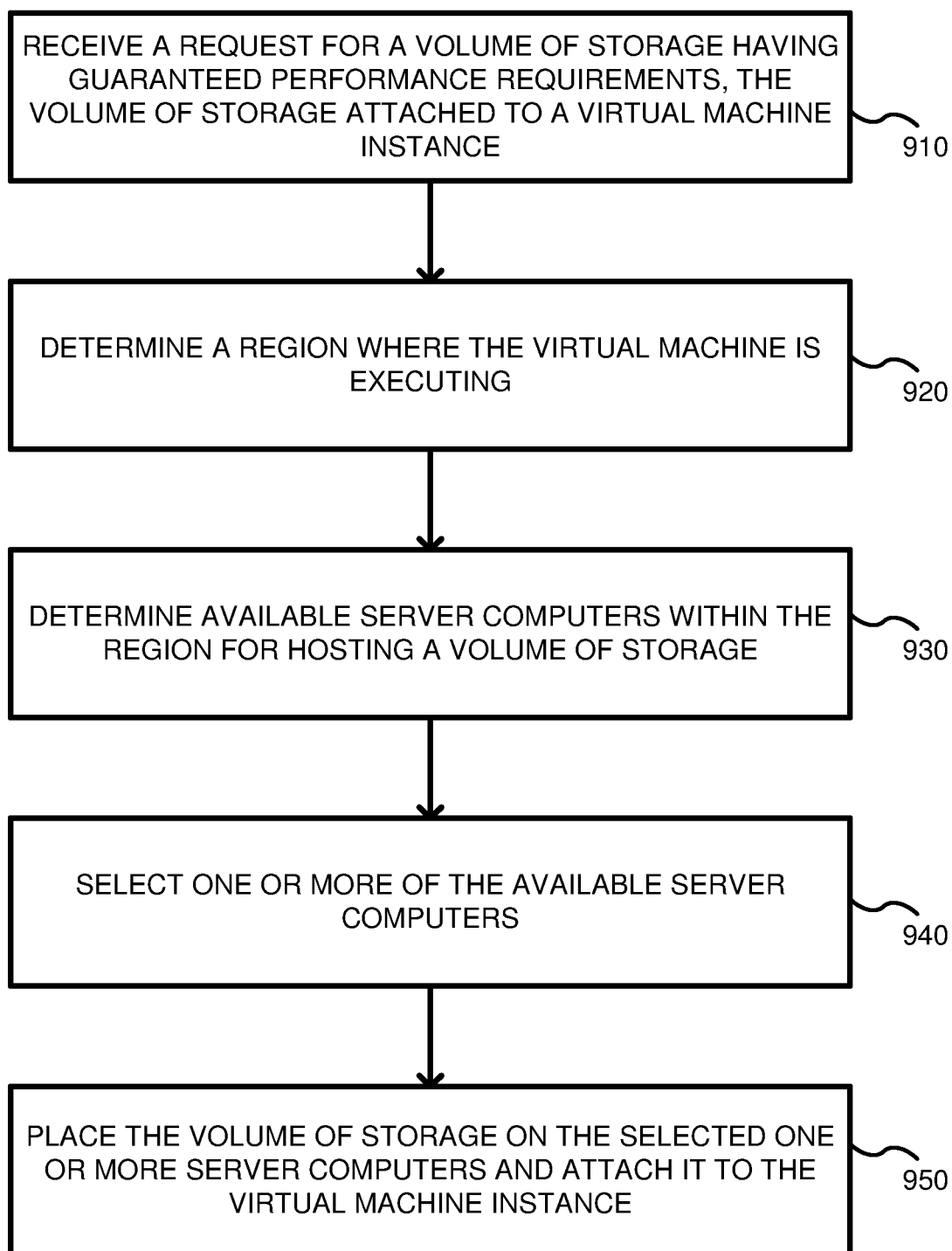
FIG. 9 is a flowchart of a method for placing a volume based on performance requirements.

FIG. 9 is a flowchart according to one embodiment, for placing volumes. In process block 910, a request is received for a volume of storage having guaranteed performance requirements, wherein the volume of storage is to be attached to a virtual machine instance. The guaranteed performance requirements means that a threshold level of performance is maintained, such as 40K TOPS. The request can be in a variety of formats, but generally includes a type of the volume of storage. As shown in FIG. 8 at 830, the request can include a list of alternative options of volume types in priority order. In process block 920, a region where the virtual machine is executing is determined. For example, returning to FIG. 1, the instance manager 140 can launch a virtual machine 144 within a region 1 and transmit a request 142 to the block storage service for placing a volume associated with the virtual machine. The request 142 can include an identifier of region 1 so that the block storage manager 150 places the volume within the same region. In process block 930, available server computers within the determined region can be identified. For example, returning to FIG. 1, the server pool 160 can be used by the block storage manager 150 to determine which server computers within region 1 are available for hosting a volume. As another example, turning to FIG. 7, the block storage service 760 can request the capacity tracker 716 for available server computers from the capacity pool. Generally, the server computers within the region are interconnected in the data center in a spine-leaf network topology and the region includes at most one spine to guarantee that performance requirements are met with communications between the virtual machine instance and the volume of storage. In process block 940, the block storage service selects one or more of the available server computers. Generally, the selection entails finding a server computer that is available and that is within a same region as the virtual machine instance. Once such a server computer is identified, the volume of storage can be placed on the selected one or more server computers and attached to the associated virtual machine instance (process block 950). In some cases, a volume includes multiple partitions and the partitions can be stored on multiple server computers. In such a case, selection of the available server computers can include selecting multiple server computers upon which to store the volume and all of those server computers associated with the same volume are in the same region.

Figure 10:
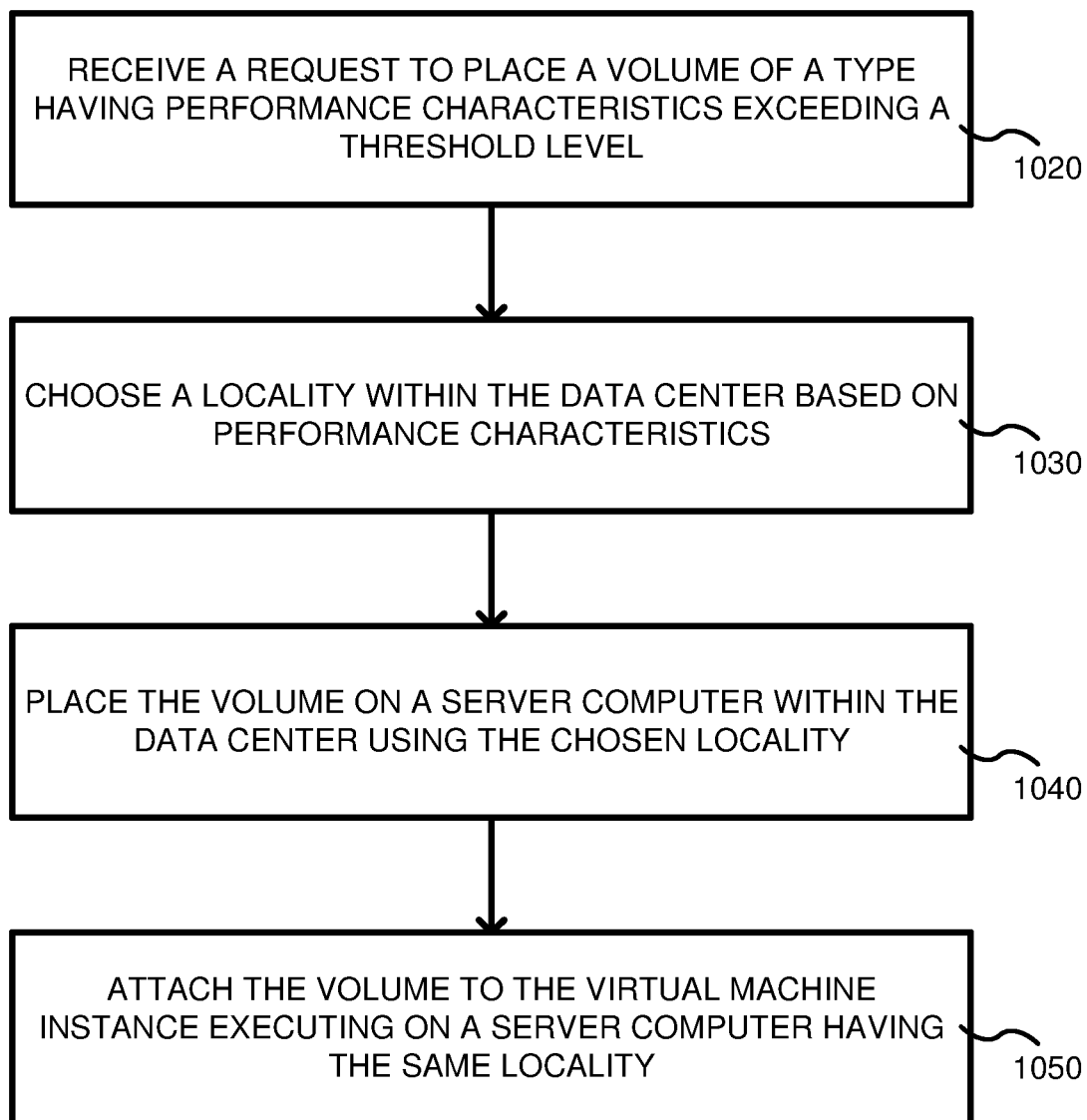
FIG. 10 is a flowchart of a method according to another embodiment for placing a volume based on performance requirements.

FIG. 10 is a flowchart according to another embodiment for placing a volume of storage. In process block 1020, a request is received to place a volume of a type having performance characteristics exceeding a threshold level. Typically, such volume types require the volume of storage to be within a same region as a server computer hosting the attached virtual machine instance. In process block 1030, a locality within a data center is chosen based on the performance characteristics. The locality is one of the regions available in the data center. As described above, a region could be defined as a storage rack, a spine within a network topology, or a data center. Generally, a region can be measured in how many switches are traversed in a communication from the instance to the attached volume with no more than a maximum number (a predetermined number) of switches. Alternatively, the region can be defined by a network topology, such as a region includes no more than one spine, so that packets between the volume and the virtual machine instance are not transmitted to switches beyond the spine. These techniques ensure that performance characteristics that are guaranteed can be met. In process block 1040, the volume is placed on a server computer within the data center using the chosen locality. As a result, the volume is within a same region as its associated virtual machine instance so as to ensure that performance characteristics can exceed the threshold level. In process block 1050, the virtual machine instance is attached to the volume so that both the virtual machine instance and the volume are attached within a same region.

Figure 11:
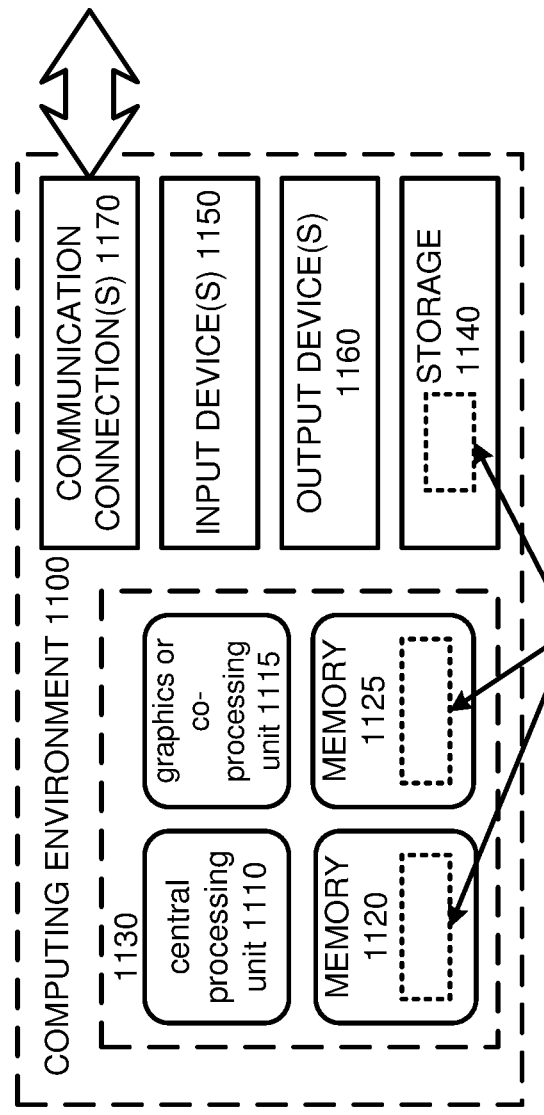
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:
1. A system comprising:
a first server computer hosting a virtual machine instance;
a second server computer configured to host storage volumes;
at least one server computer in a control plane configured to:
receive a request to associate a storage volume with the virtual machine instance; and
select the second server computer to host the storage volume associated with the virtual machine instance based at least in part on a proximity of the second server computer to the first server computer hosting the virtual machine instance,
wherein the first server computer and second server computer are within a data center of a cloud provider, and
wherein the data center includes server computers interconnected in a spine-leaf network topology and the second server computer is selected to be within a same spine as the first server computer in the spine-leaf network topology.

2. The system of claim 1, wherein the proximity of the second server computer to the first server computer is selected to ensure that communications between the virtual machine instance and the storage volume are limited to traversing a predetermined number of switches.

3. The system of claim 2, wherein the predetermined number of switches are between 1 and 5 switches.

4. The system of claim 1, wherein, due to the proximity between the virtual machine instance and the storage volume, a minimum latency is guaranteed for communications there between.

5. A computer-implemented method, comprising:
receiving a request to associate a volume with a virtual machine hosted by a cloud provider; and
launching the volume on a storage device within the cloud provider, the storage device selected based at least in part on a proximity between the storage device and a server computer hosting the virtual machine,
wherein the storage device and the server computer hosting the virtual machine are within a data center of the cloud provider, and
wherein the data center includes server computers interconnected in a spine-leaf network topology and the storage device is selected to be within a same spine in the spine-leaf network topology as the server computer hosting the virtual machine.

6. The computer-implemented method of claim 5, wherein the server computer hosting the virtual machine is a first server computer and the storage device is a second server computer, the first and second server computers being coupled together through a network of routers within the data center.

7. The computer-implemented method of claim 5, wherein the proximity between the storage device and the server computer hosting the virtual machine ensures that performance characteristics are met including any one of the following: a minimum Input/Output Operations Per Second (IOPS), a minimum latency or a minimum throughput.

8. The computer-implemented method of claim 5, wherein the volume is a first volume, and wherein the computer-implemented method further includes:
monitoring usage of volumes within the cloud provider; and
moving a second volume having usage below a threshold level to free up storage space for the first volume, wherein the second volume is moved from a first data center including the server computer hosting the virtual machine to a second data center.

9. The computer-implemented method of claim 5, wherein if the volume on the storage device is not within the proximity which is needed to meet performance requirements, the request to associate the volume is rejected.

10. The computer-implemented method of claim 5, wherein the request includes a list of alternative levels of performance characteristics in a priority order for communications between the storage device and the server computer hosting the virtual machine.

11. The computer-implemented method of claim 10, wherein if a first performance characteristic on the list is not achievable, then a next level of performance characteristics on the list is analyzed and a different locality of the storage device is chosen to meet the next level of performance characteristics.

12. The computer-implemented method of claim 5, wherein the proximity of the storage device to the server computer hosting the virtual machine is selected to ensure that communications between the virtual machine and the volume are limited to traversing a predetermined number of switches in a network.

13. The computer-implemented method of claim 12, wherein the predetermined number of switches are between 1 and 5 switches.

14. A method, comprising:
receiving a request to associate a volume hosted by a cloud provider with a virtual machine hosted by the cloud provider; and
launching the volume on a storage device, the storage device selected based at least in part on a number of switches that are traversed for communications between the storage device and a server computer hosting the virtual machine,
wherein the storage device and the server computer hosting the virtual machine are within a data center of the cloud provider, and
wherein the data center includes server computers interconnected in a spine-leaf network topology and the storage device is selected to be within a same spine in the spine-leaf network topology as the server computer hosting the virtual machine.

15. The method of claim 14, wherein the volume is a first volume, the method further including moving a second volume having usage below a threshold level to free up storage space for the first volume, wherein the second volume is moved from a first data center including the server computer hosting the virtual machine to a second data center.

16. The method of claim 14, further including communicating between the storage device and the server computer hosting the virtual machine with a minimum guaranteed latency.

* * * * *